US010928311B2

(12) United States Patent
Furstenberg et al.

(10) Patent No.: US 10,928,311 B2
(45) Date of Patent: Feb. 23, 2021

(54) RAPID MULTIPLEXED INFRARED 3D NANO-TOMOGRAPHY

(71) Applicant: The Government of the United States of America, as represented by the Secretary of the Navy, Arlington, VA (US)

(72) Inventors: Robert Furstenberg, Burke, VA (US); Tyler Huffman, Alexandria, VA (US); Chris Kendziora, Burke, VA (US); R. Andrew McGill, Lorton, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 17 days.

(21) Appl. No.: 16/382,621

(22) Filed: Apr. 12, 2019

(65) Prior Publication Data
US 2019/0317012 A1    Oct. 17, 2019

Related U.S. Application Data

(60) Provisional application No. 62/658,644, filed on Apr. 17, 2018.

(51) Int. Cl.
*G01N 21/31*    (2006.01)
*G01N 21/17*    (2006.01)

(52) U.S. Cl.
CPC ..... *G01N 21/31* (2013.01); *G01N 2021/1787* (2013.01); *G01N 2201/12* (2013.01)

(58) Field of Classification Search
CPC .... G01N 21/55; G01N 21/17; G01N 21/1717; G01B 11/0633
USPC .......................................................... 356/601
See application file for complete search history.

(56) References Cited

U.S. PATENT DOCUMENTS

| | | | | |
|---|---|---|---|---|
| 4,750,822 A * | 6/1988 | Rosencwaig | .......... | G01N 21/17 356/432 |
| 4,795,260 A * | 1/1989 | Schuur | .................... | G01N 21/17 356/400 |
| 5,982,499 A * | 11/1999 | Chichester | ............. | G01N 21/55 356/417 |
| 6,268,916 B1 * | 7/2001 | Lee | ...................... | G01B 11/065 356/369 |
| 6,323,951 B1 * | 11/2001 | Borden | .............. | G01N 21/1717 356/502 |
| 6,795,198 B1 * | 9/2004 | Fuchs | ................ | G01B 11/0666 356/521 |

(Continued)

*Primary Examiner* — Roy M Punnoose
(74) *Attorney, Agent, or Firm* — US Naval Research Laboratory; Rebecca Forman (57) ABSTRACT

A method and system for rapid, label free nanoscale chemical imaging and tomography (3D) with multiplexing for speed, and engineered coherent illumination and detection to achieve 3-D resolution at twice the Abbe limit. A sample undergoes photo-thermal heating using a modulated infrared light source and the resulting probe beam modulation is measured with one or more visible laser probes. Varying the infrared wavelength results in a spectrum which characterizes the chemical composition of the sample. Optionally, inelastically scattered light generated as a result of the probe beam interacting with the sample is collected simultaneously to yield additional chemical information.

19 Claims, 6 Drawing Sheets

(56) References Cited

U.S. PATENT DOCUMENTS

| | | | |
|---|---|---|---|
| 7,106,446 B2* | 9/2006 | Nicolaides | G01N 21/1717 |
| | | | 356/445 |
| 7,502,104 B2* | 3/2009 | Salnik | G01N 21/1717 |
| | | | 356/237.2 |
| 9,772,297 B2* | 9/2017 | Nicolaides | G01N 21/9505 |
| 9,841,324 B2 | 12/2017 | Furstenberg et al. | |
| 2003/0234932 A1* | 12/2003 | Nicolaides | G01N 21/39 |
| | | | 356/445 |
| 2004/0169859 A1* | 9/2004 | Smith | G01N 21/1717 |
| | | | 356/369 |
| 2006/0012791 A1* | 1/2006 | Reinhorn | G01N 21/9501 |
| | | | 356/432 |
| 2006/0215175 A1* | 9/2006 | Yacoubian | G01N 21/9505 |
| | | | 356/502 |
| 2008/0036998 A1* | 2/2008 | Salnik | G01N 21/55 |
| | | | 356/36 |
| 2008/0225267 A1* | 9/2008 | Murtagh | G01N 21/1717 |
| | | | 356/32 |
| 2008/0304046 A1* | 12/2008 | Lee | G01N 21/636 |
| | | | 356/51 |
| 2008/0304047 A1* | 12/2008 | Lee | G01J 3/433 |
| | | | 356/51 |
| 2009/0033931 A1* | 2/2009 | Murtagh | G01N 21/1717 |
| | | | 356/317 |
| 2013/0134310 A1 | 5/2013 | Furstenberg et al. | |
| 2015/0110150 A1* | 4/2015 | Schmidt | G01N 21/55 |
| | | | 374/43 |
| 2018/0066989 A1 | 3/2018 | Furstenberg et al. | |
| 2018/0088041 A1 | 3/2018 | Zhang et al. | |
| 2019/0120753 A1* | 4/2019 | Prater | G01N 21/552 |

* cited by examiner

RAPID MULTIPLEXED INFRARED 3D NANO-TOMOGRAPHY

PRIORITY CLAIM

The present application is a non-provisional application claiming the benefit of U.S. Provisional Application No. 62/658,644, filed on Apr. 17, 2018 by Robert Furstenberg et al., entitled "A PHOTO-THERMAL APPROACH TO PERFORM HIGH SPEED INFRARED HYPER-SPECTRAL IMAGING AND TOMOGRAPHY WITH SUB MICRON RESOLUTION." The entire contents of this provisional application and all references cited within the present application are incorporated herein by reference.

BACKGROUND OF THE INVENTION

Field of the Invention

The present invention relates to rapid, label free nanoscale chemical imaging and tomography (3D).

Description of the Prior Art

Optical (visible) microscopy has established itself as an invaluable tool in material science, and the canonical technique in biology. The usefulness of optical microscopy in the life sciences, in particular, is largely due to the fact that the resolution—on the order of a few hundred nanometers—is quite appropriate for studying structures within biological cells. Nevertheless, an optical microscopy image lacks clear information about the chemical composition of the sample. Extending the optical microscope to provide chemical contrast has long been something of a holy grail for the field of microscopy. Unfortunately, the solutions developed thus far either:

- Require engineered chemical "labels" to highlight specific chemicals of interest
- Are too slow to study chemical dynamics
- Incapable of 3-dimensional imaging (tomography)
- Achieve significantly worse spatial resolution than the best optical microscopes (~100 nm).

As will be discussed presently, prior techniques completely fail to deliver on one or more of the above points.

A great deal of effort has been spent to achieve contrast between different chemical species through the use of chemical dyes—most notably fluorescent markers. By their very nature, these techniques must be tailored to the sample under investigation and the specific experimental question. For example, a carefully chosen fluorescent marker might highlight a chemical structure of interest. Note that the practicality and availability of an appropriate dye is a nontrivial—and often prohibitive—experimental barrier. Eliminating the need for such dyes has the potential to revolutionize biology and medicine from fundamental biological and biotechnology research to pathology and diagnostics.

Raman spectroscopy, like fluorescence exploits the inelastic scattering of the photon by the sample. The advantage being that the Raman spectrum constitutes a unique chemical fingerprint. Thus, Raman microscopy is a truly label-free chemical microscopy that achieves resolution comparable to a traditional optical microscope. However, only one photon undergoes Raman scattering for every million or so incident photons. This extremely low interaction probability places a limit on the speed of Raman imaging when the pump laser is used at powers below the damage threshold of the sample. Imaging times of many hours or even days are not uncommon.

There is a nontrivial complication when one attempts to use fluorescence and Raman microscopy together. Because the Raman and fluorescence cross sections can vary by orders of magnitude depending on the sample, the techniques are, for all practical purposes, mutually exclusive. For example, in a sample that has been prepared with highly fluorescent labels, the high degree of inelastically scattered light emitted by these fluorophores will compromise the quality of the Raman spectra even at points where there is no fluorophore present. The experimental consequence is that the two techniques cannot be effectively combined, even though it would be quite useful to acquire a simultaneous label-free chemical image to elucidate the context within which the labeled chemicals reside.

The competing label-free technique is infrared microscopy. Atoms in a chemical species vibrate at frequencies characteristic of their unique chemical structure: their normal modes. Provided a particular normal mode contains a dipole moment (odd parity), a single photon of the same temporal frequency can be used to excite one of these vibrations. By measuring the material's response at various infrared frequencies, it is possible to measure the structure's vibrational fingerprint. For normal modes of even parity, multiple photons must interact simultaneously to excite the vibration (i.e. Raman scattering). Consequently, infrared and Raman spectroscopy are complementary techniques, each characterizing the set of vibrational modes of appropriate parity. The single-photon nature of infrared absorption yields a much higher interaction probability many orders of magnitude higher than Raman scattering. However, the wavelengths in this fingerprinting region of the spectrum are ten to 100 times larger than the wavelengths of visible and near-visible light used in Raman spectroscopy. As a consequence, the resolution in infrared microscopy is quite poor, and completely inappropriate for imaging sub-cellular structure. This poor resolution has limited the usefulness of infrared spectroscopy as a microscopy tool. Although it has found some applications where speed and large field of view are higher priorities than spatial resolution.

Scanning probe techniques have recently been developed to realize infrared microspectroscopy with spatial resolutions below the infrared diffraction limit to great impact in the literature. The two most mature techniques, AFM-IR (Hammiche et al., "Photothermal FT-IR Spectroscopy: A Step Towards FT-IR Microscopy at a Resolution Better Than the Diffraction Limit," Appl. Spectrosc., 53, 810-815 (1999) and Hill at al., "Submicrometer infrared surface imaging using a scanning-probe microscope and an optical parametric oscillator laser," Opt. Lett., 34, 431-433 (2009)) and scattering-type scanning near-field optical microscopy (s-SNOM) (Keilmann et al., "Near-field microscopy by elastic light scattering from a tip," Philos. Trans. R. Soc. London Ser. A-Mathematical Phys. Eng. Sci., 362, 787-805 (2004); Amarie et al., "Mid-infrared near-field spectroscopy," Opt. Express, 17, 21794-21801 (2009); Huth et al., "Nano-FTIR absorption spectroscopy of molecular fingerprints at 20 nm spatial resolution," Nano Lett., 12, 3973-78 (2012); and Bechtel et al., "Ultrabroadband infrared nano-spectroscopic imaging," Proc. Natl. Acad. Sci. U.S.A., 111, 7191-96 (2014)), function as complimentary techniques most appropriate to probe soft and hard matter samples, respectively. The former measures the deflection of an atomic force microscope (AFM) tip as the sample is heated by infrared light. The latter measures the scattering of light due to the interaction of a metal coated AFM tip with the sample. As both of these effects are quite local, the resolution for both is fixed by the tip radius.

Together, their collective impact cannot be understated. Systems such as phase coexistence in correlated oxides (Qazilbash et al., "Mott transition in $VO_2$ revealed by infrared spectroscopy and nano-imaging," Science, 318, 1750-53 (2007) and Liu et al., "Anisotropic Electronic State via Spontaneous Phase Separation in Strained Vanadium Dioxide Films," Phys. Rev. Lett., 111, 96602 (2013)), polymer photo-catalysts (Ghosh et al., "conducting polymer nanostructures for photocatalysis under visible light," Nat. Mater., 14, 505-511 (2015)), and plasmons in the 2-dimensional materials: graphene and boron nitride (Fei et al., "Tunneling Plasmonics in Bilayer Graphene," NANO Lett., 15, 4973-78 (2015); Dai et al., "Graphene on hexagonal boron nitride as a tunable hyperbolic metamaterial," Nat. Nanotechnol., 10, 682-686 (2015); Fei et al., "Gate-tuning of graphene plasmons revealed by infrared nano-imaging," Nature, 487, 82-85 (2012): and Dai et al., "Tunable Phonon Polaritons in Atomically Thin van der Waals Crystals of Boron Nitride," Science, 343, 1125-11129 (2014)) have produced high impact on the literature. Nevertheless, both techniques share limitations that result from their AFM-based nature:

They are both inherently surface based techniques; they do not provide information about the chemical composition within the bulk of the sample. In s-SNOM, the wave vector in the z direction is imaginary. While this property is what enables s-SNOM to achieve resolutions far surpassing the diffraction limit, the exponentially decaying electric field into the sample precludes the characterization of all but the regions within a few tip radii of the surface—typically 50-75 nm. In AFM-IR, the thermal expansion of the sample under the tip is measured in response to infrared light. The measured expansion is averaged over the various chemical components under the tip. Thus, the effective resolution in the z-direction is comparable to the far-field infrared technique.

Even in ideal conditions, the acquisition of a spectrum with both techniques requires a few seconds. At this rate, supposing three seconds per pixel, a hyper-spectral image of 200×200 pixels would require 33 hours to acquire. Therefore, at full resolution, analysis of samples with a spatial size range greater than about a micron (~50×50 pixels) is impractical. Therefore, practitioners of these techniques almost always are forced to resort to acquiring spectroscopic data along a line, or individual points, while the image itself is acquired with monochromatic light. For s-SNOM, this rate of data acquisition is something of a hard upper limit, as the detector—a photovoltaic MCT—is background limited and the source—a synchroton—is so intense as to risk melting the metal coating on the AFM tip (Bechtel et al., "Ultrabroadband infrared nanospectroscopic imaging," Proc. Natl. Acad. Sci. U.S.A., 111, 7191-96 (2014)).

Both techniques are quire restrictive in terms of what samples can be investigated. Both techniques require particularly flat samples. Samples with surface roughness exceeding 100 nm are time consuming to measure, and risk of damage to the AFM tip is high. Rougher samples quickly become impractical if not impossible to measure.

There are significant experimental challenges, particularly in non-ideal environments such as extreme temperatures. For example, despite being aggressively perused for a decade or more, cryogenic s-SNOM has only recently become a reality (Yang et al., "A cryogenic scattering-type scanning near-field optical microscope," Rev. Sci. Instrum., 84, 23701 (2013) and Mcleod et al., "Nanotextured phase coexistence in the correlated insulator $V_2O_3$," Nature Physics, 13, 80-86 (2016)). While these techniques are extremely powerful for specialists, their application by non-specialists has been limited thus far.

A complimentary non-AFM based technique to circumvent these limitations is necessary. Recently, a new technique has been demonstrated, which shows potential to fill this niche. In this technique, the sample is pumped with monochromatic infrared light generated by a pulsed quantum cascade laser (QCL). The various chemical components in the sample absorb the infrared light when the frequency of the infrared light generated by the QCL is equal to one of the vibrational modes of the chemical structure. When this occurs, the material heats up, altering the complex index of refraction of the material at all wavelengths. This change can be observed with light of a much shorter wavelength to dramatically improve on the IR diffraction limit. Thus far, both reflectance (Furstenberg et al., "chemical imaging using infrared photothermal microspectroscopy," Next-Generation Spectrosc. Technol. V, 8374, 837411 (2012)) and transmission (Zhang et al., "Depth-resolved mid-infrared photothermal imaging of living cells and organisms with submicrometer spatial resolution," Sci. Adv., 2, 1-8 (2016)) geometries have been realized.

A transmission microscopy geometry was realized using 785 nm laser light as the probe beam (Zhang et al., "Depth-resolved mid-infrared photothermal imaging of living cells and organisms with submicrometer spatial resolution," Sci. Adv., 2, 1-8 (2016)). The change in the index of refraction results in a perturbation in the intensity and path of the probe beam, which can be detected via a photodiode and appropriate optics. As the sample heats and cools in response to each QCL pulse, the photodiode signal is modulated at the QCL repetition rate. The amplitude of the modulation of the probe beam ($\Delta P_{pr}$) can then be recorded at each position of the sample (x,y), for each frequency of the QCL ($\upsilon$) to acquire a hyper-spectral image where each spectra is proportional to the well-tabulated IR absorption spectra.

BRIEF SUMMARY OF THE INVENTION

The aforementioned criteria for an "ideal" microscope are overcome in the present invention, which we refer to as Optically Super-resolved InfraRed Imaging Spectroscopy (OSIRIS). Sufficient speed to study chemical dynamics is provided primarily by utilizing "N" multiple probe beams to increase the image acquisition rate N-fold. This method is made practical through the use of cost-effective demodulation circuitry for each channel. Optionally, each sample location is interrogated by the probe beam multiple "M" times. This enhances the photo-thermally induced modulation M times. Relative to a single pass photo-thermal microscope with a single probe beam, the image acquisition rate is improved by $NM^2$. In this way, an improvement in imaging speed exceeding 1000 times is quite feasible. This speed enhancement allows for studying dynamic samples (e.g., fast moving cells or other micro-organisms). The sample is moved relative to the beams by either a motorized stage or a scan mirror to obtain 3D hyper-spectral images. Further analysis yields 3D chemical images or concentration maps. Additionally, coherent illumination and detection can be used to collect (hyperspectral) images with a transverse spatial resolution of twice the Abbe limit of the probe beam, hereafter referred to as "super-resolution." When a highly coherent multi-pass probe beam is used, a standing wave forms which permits similar resolution along the axial "z" direction as well. Such an image contains the maximum possible spatial information achievable with propagating light. The amplitude and/or phase of the highly coherent probe beams, both before or after interacting with the sample, can be altered to optimize the point spread function (for example, to balance imaging speed and resolution or correct for aberrations that arise when performing tomography deep within the sample).

The present invention has advantages over the prior art. One main advantage is the ability to perform real-time 3D chemical mapping (tomography) at ~100 nm isotropic spatial resolution. This is not currently possible with any instrument. This spatial resolution is achieved using coherent illumination and the standing-wave created in the sample by the multi-pass (4-Pi like) geometry. For tomography, the voxel is 28 times smaller than that achieved in traditional confocal microscopy. Multiplexing the probe beams allows for an unprecedented increase in scan speed. Moreover, the present invention trivially acquires inelastic scattering spectral images simultaneously with the OSIRIS spectral images at the same resolution. The data sets complement each other in some cases and ensure that the present invention is a clearly progressive improvement of the art.

Figure 1A:
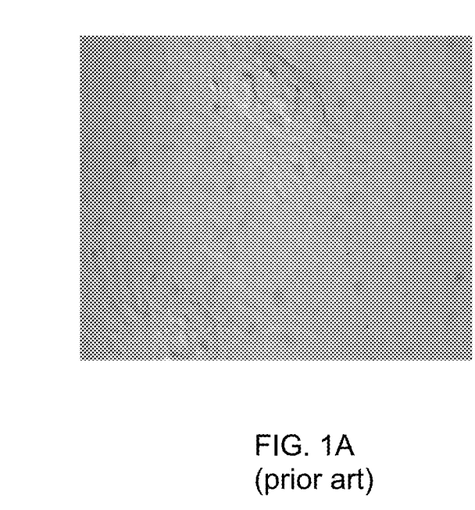
FIG. 1A is an image obtained by optical microscopy.
Figure 1B:
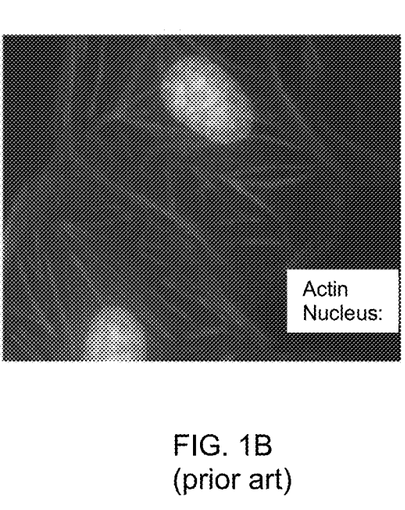
FIG. 1B is an image obtained by fluorescence microscopy.
Figure 1C:
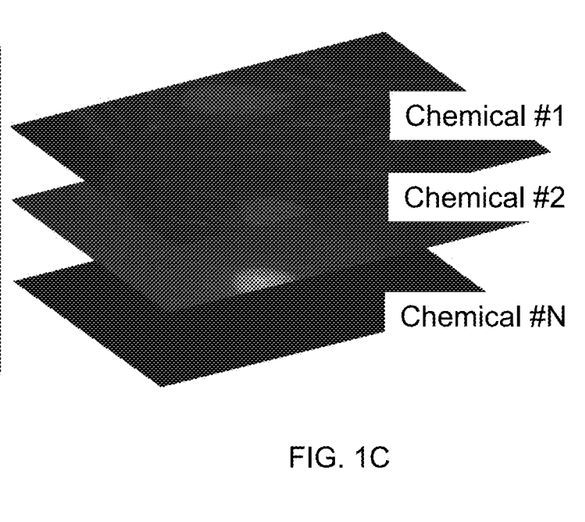
FIG. 1C is conceptual illustration of a chemical map. The concentration of each chemical species is recorded at each pixel.

The ultimate aim of the technique, and an illustration of how it improves over the prior art, is illustrated in FIGS. 1A-1C. In one possible visualization of a chemical image, each pixel color represents the material in that location. The present invention adds complete label-free chemical information to a standard microscopic representation (such as a cell). FIGS. 1A-1C compare bright-field optical microscopy and fluorescence microscopy to the label-free chemical maps of the present invention. These three techniques constitute the major milestones in the field of microscopy. FIG. 1A is an image obtained by conventional widefield optical microscopy. FIG. 1B is an image obtained by fluorescence microscopy. Chemical species of interest are labeled with a fluorescent marker, adding chemical content to the image. FIG. 1C is an abstract chemical map visualizing the concentration of each chemical species at each pixel. Such a chemical map—the final product of an OSIRIS experiment—provides complete chemical context. It is highly applicable to situations where the relevant chemical actors are unknown a-priori.

These and other features and advantages of the invention, as well as the invention itself, will become better understood by reference to the following detailed description, appended claims, and accompanying drawings.

BRIEF DESCRIPTION OF THE DRAWINGS

FIGS. 1A-1C compare optical microscopy and fluorescence microscopy to the label-free full chemical maps of the present invention.

DETAILED DESCRIPTION OF THE INVENTION

The present invention provides a non-contact and non-destructive method and system for rapid, label free, nanoscale chemical imaging and tomography (3D). A sample undergoes photo-thermal heating using an IR laser and the resulting increase in temperature is measured by the modulation of one or more visible probes after they've interacted with the sample. Coherent illumination and detection is used to provide "super resolution" and better image quality.

The inelastically scattered light generated by the probe beam is separated in the detection arm via a dichroic mirror and detected via a high-gain photodetector. Spectral analysis of this light can be performed in a number of ways (suppressed for clarity), either through the use of multiple filters and dichroic mirrors, a diffraction grating, or an interferometric approach. Such a scheme provides access to all of the benefits of fluorescence and Raman microscopy in the same instrument.

Optical Super-Resolved InfraRed Imaging Spectral (OSIRIS) Microscopy

For OSIRIS microscopy, a sample undergoes photo-thermal heating using an IR laser. The various chemical components in the sample absorb the infrared light when the frequency of the infrared light equals one of the vibrational modes of the chemical structure. When this occurs, the material heats up and expands, and the complex index of refraction of the material at all wavelengths is altered. This change can be observed with light of a much shorter wavelength. When modulated infrared light is used, the resulting modulation of the sample temperature is measured via the modulation of a short wavelength laser probe either reflected from or transmitted through the sample. The visible laser probe (operated in continuous wave (cw) mode) is co-focused with the IR beam at the sample.

Figure 2:
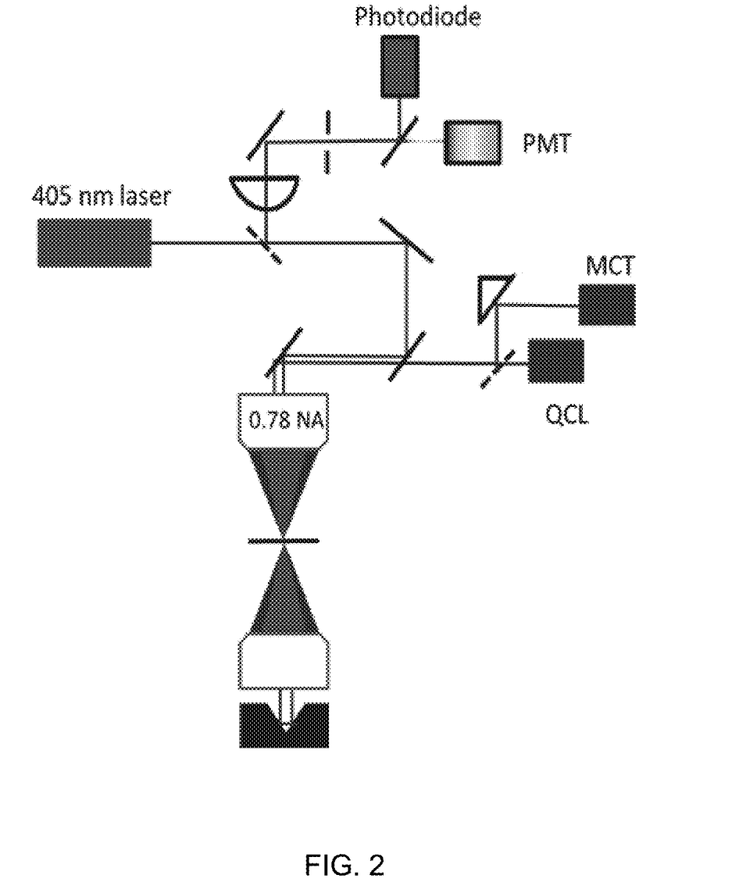
FIG. 2 is a schematic overview of an OSIRIS microscope.

FIG. 2 shows the schematic drawing of the microscope. The infrared light from a QCL is combined with the output from a laser (~405 nm in one example) using a dichroic filter. Both beams are focused on the sample using a reflecting objective (0.78 NA in one example). The sample rests horizontally on a motorized stage. The visible light is transmitted through a transparent sample, collimated using a second objective, and reflected back through the same location on the sample using a retroreflector. Alternatively, the visible light can be reflected from a non-transparent sample. The reflected light is focused onto a multi-mode optical fiber (100 μm core size) that carries the light to a photodiode. A multi-pass geometry (adding a second objective and a retroreflector below the sample) allows for improved axial resolution and increased OSIRIS signal strength. By moving the sample relative to the beams, 3D hyperspectral images are obtained.

Tomographic Resolution

The combination of coherent illumination and detection, along with a multi-pass geometry allows for 3D imaging of transparent or semi-transparent samples at the highest resolutions possible with propagating light. For example, a scanning microscope using coherent illumination and detection with 405 nm light and a 0.78 N.A. objective has a theoretical resolution of approximately 123 nm. This enhancement is valid for either a reflectance or transmission geometry.

Figure 3:
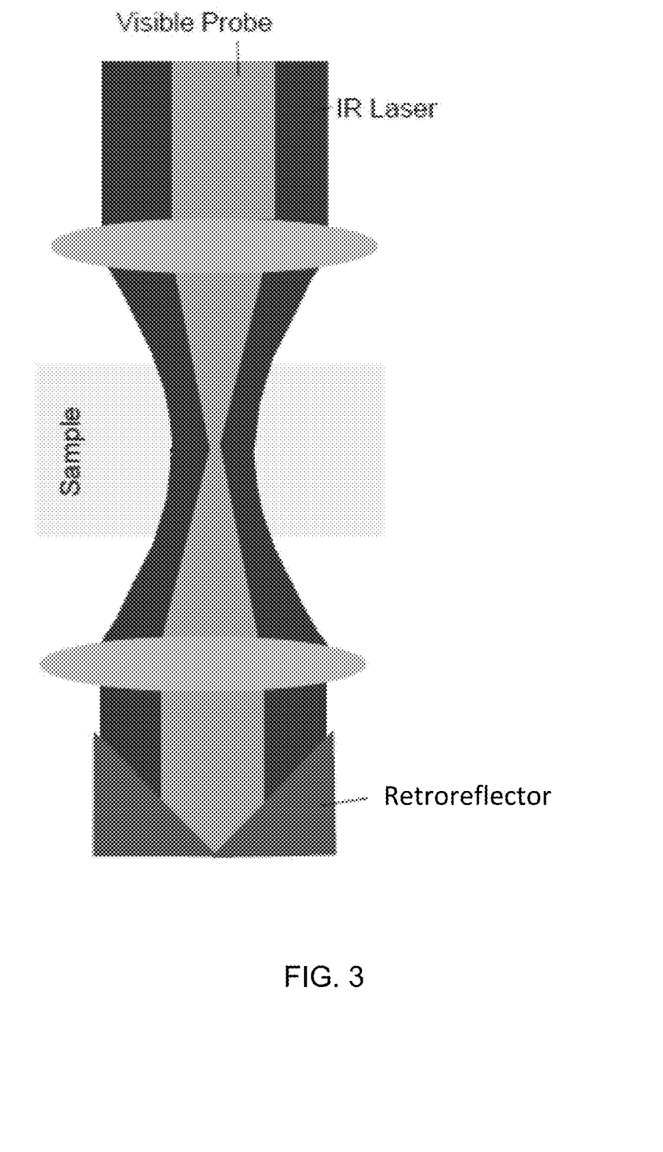
FIG. 3 is a schematic overview of the transmission modality.
Figure 4:
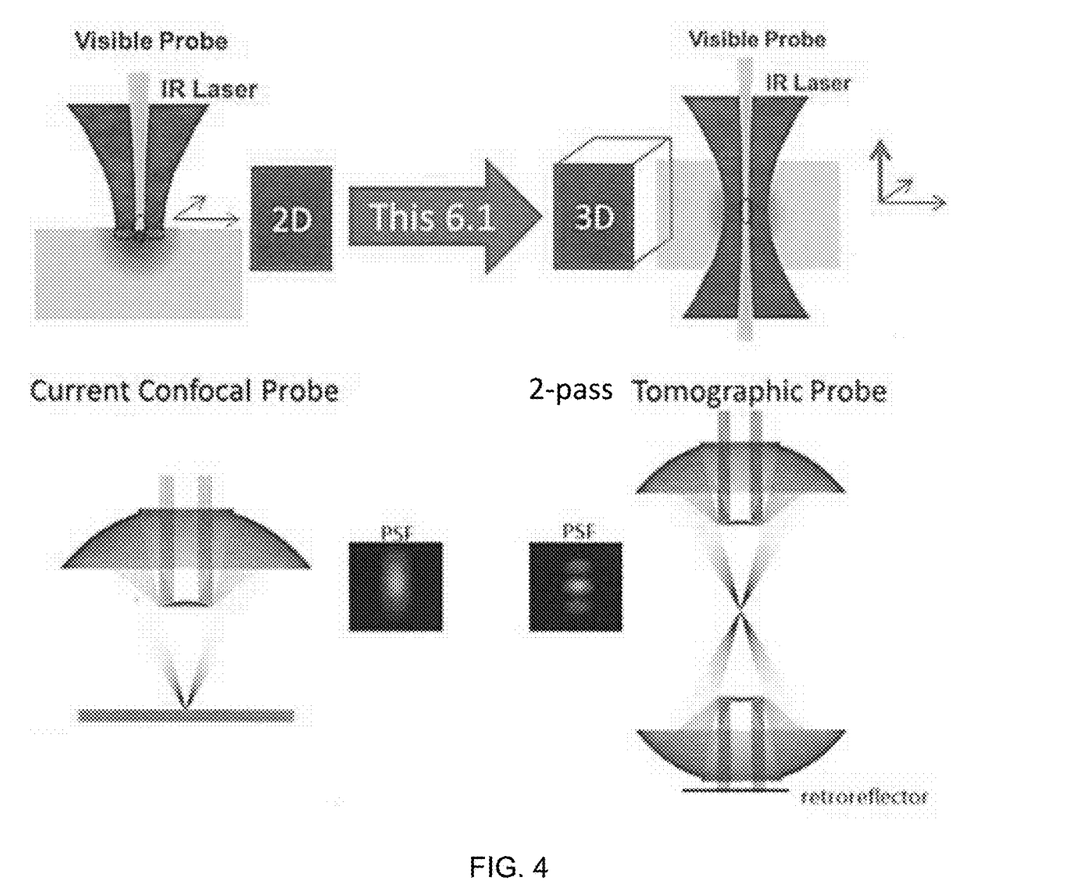
FIG. 4 is a schematic overview comparing a reflective confocal probe with a 2-pass tomographic probe.

The voxel resolution can be improved further for transparent and semi-transparent samples. The probe can be passed through the sample twice (or more) times, creating a standing wave along the optical axis (z direction). The resolution in this case is essentially $\lambda/4n$, where n is the index of refraction of the sample medium. That is to say that the resolution in this direction is equivalent to the more familiar lateral resolution that would be achieved with immersion optics and illuminating from the full half-sphere. To illustrate: In water (n=1.33), the theoretical axial resolution will be approximately 76 nm. FIG. 3 shows an example of a 2-pass modality, and FIG. 4 compares a reflective confocal probe with a 2-pass tomographic probe.

Using these two improvements, the resultant voxel is approximately 28 times smaller than what is typically achieved in confocal microscopy. The low aspect ratio voxel makes it particularly well suited for tomography. However, actually achieving high spatial resolution at various depths within the sample is a challenge due to aberrations, both spherical and otherwise, that arise as the focal plane is scanned through the sample. This must be corrected by compensation optics to modify the (complex) aperture function accordingly.

Structured (Annular) Illumination for Super-Resolution

Figure 6:
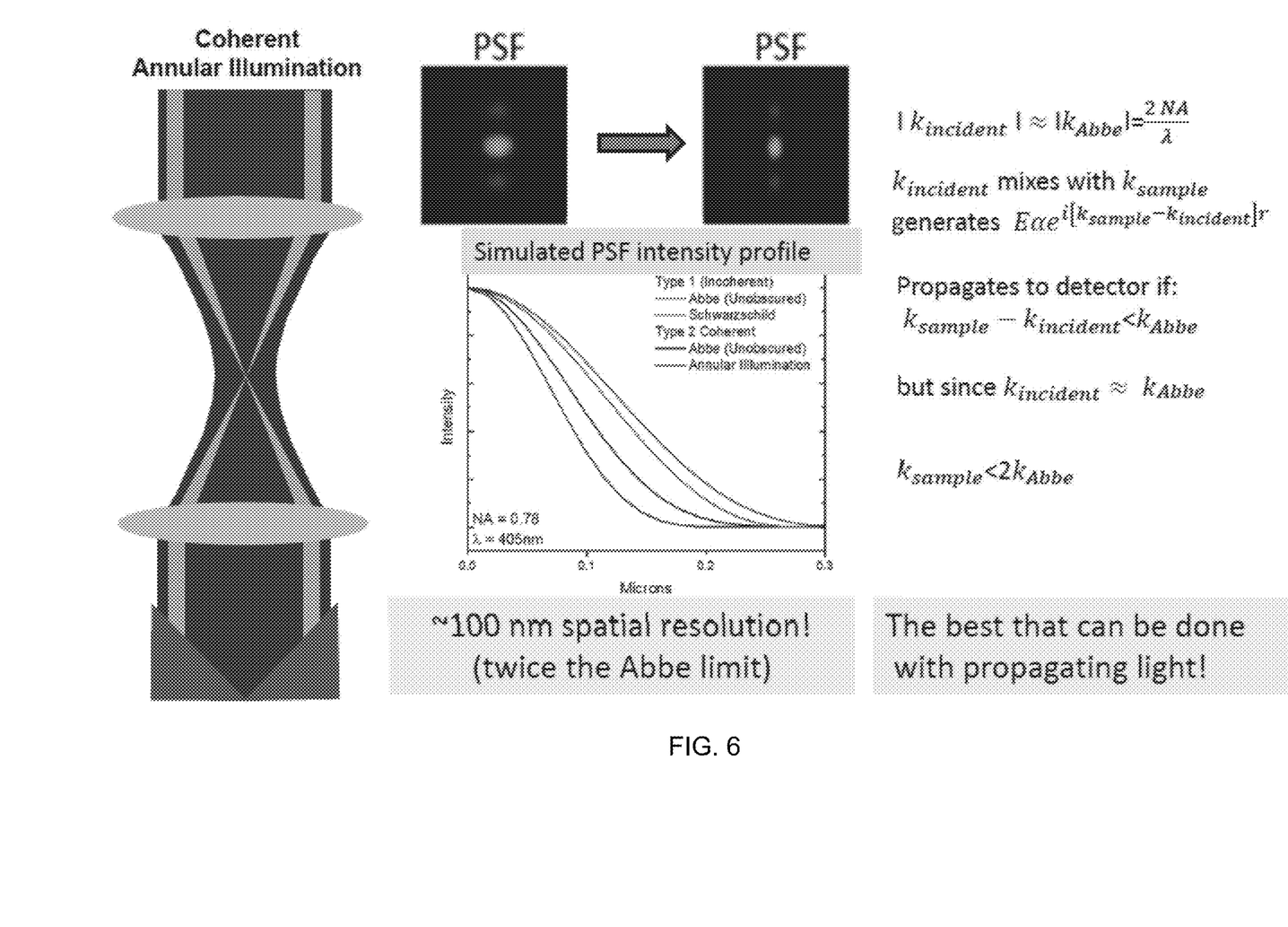
FIG. 6 is a schematic overview showing the benefits of annular illumination.

The transverse resolution enhancements discussed in the previous section are theoretical. In a real experiment, with a non-negligible noise level and a damage threshold to limit probe beam power, the practical resolution that is obtained is necessarily less than this theoretical limit. One particularly useful choice is to illuminate with an annular aperture function. The sample is illuminated with light within a narrow range of angles of incidence near the highest values allowed by the objective. FIG. 6 is a schematic drawing showing the benefits of annular illumination on the point spread function. The transfer function corresponding to this PSF is of order unity at all spatial frequencies corresponding to a resolution lower than $\lambda/4N.A.$ As a consequence, all spatial frequencies are acquired at similar SNR in similar times. This efficient use of probe light is critical to imaging at high resolutions as quickly as possible in real samples, where the intensity of the probe is limited by a damage threshold. With a more traditional illumination approach, the high resolution components of the image are collected at extremely low efficiency, and are traditionally sacrificed in favor increased image acquisition speed.

In addition to the resolution enhancement, the single angle of incidence relaxes the requirement for compensation optics except in the detection arm. That is to say that spherical aberration induced during illumination by increased depth into the sample is corrected for by design; while there is some focal length shift, the light rays of a given angle of incidence always focus at a point. Correcting for such aberrations, which are an inherent challenge of tomography, is critical to achieving a 3-D resolution on the nanoscale (100 nm and below)

Multiplexing

Figure 5:
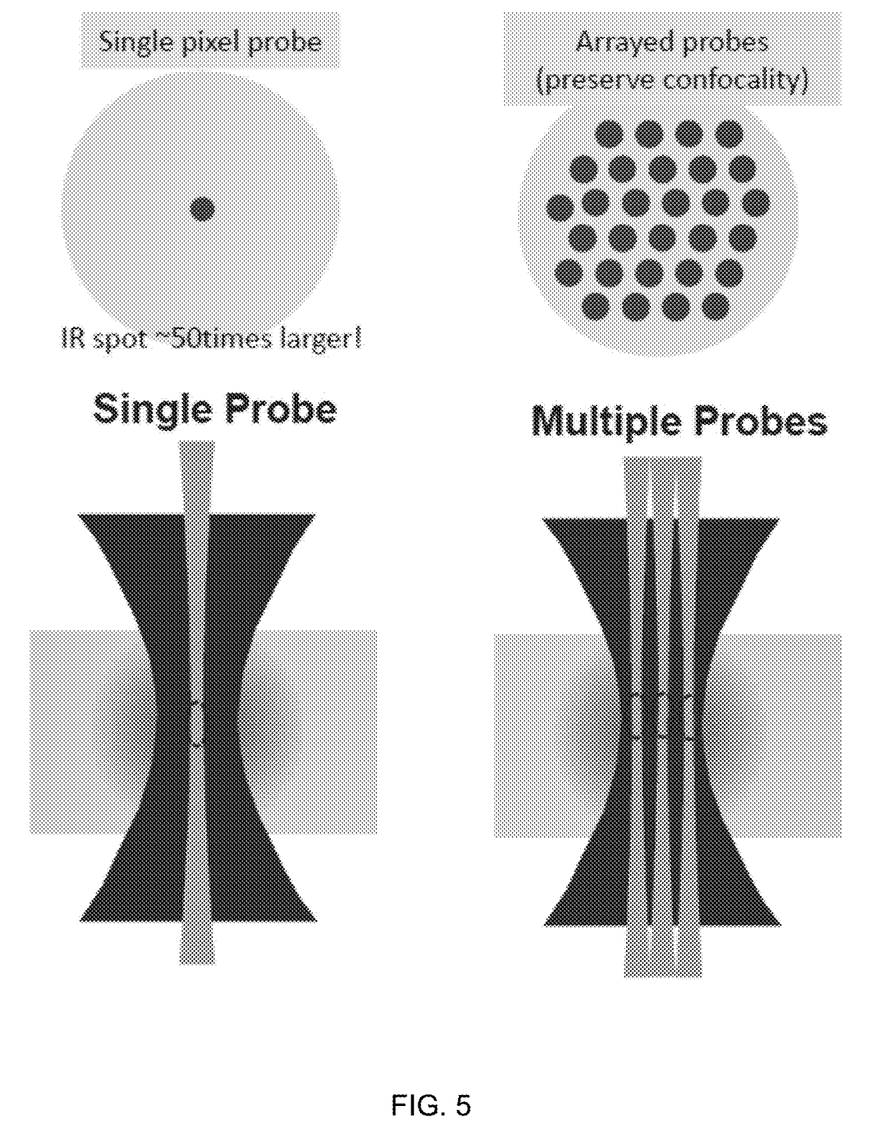
FIG. 5 is a schematic overview comparing a single probe with multiple probes.

Instead of using just one visible laser probe, multiple proves may be used. The non-contact design and large IR spot size permits virtually unlimited multiplexing. FIG. 5 is a schematic drawing comparing a single probe with multiple probes. Using multiplexing, images can be acquired with pixel times of ~50 μs (<5 mW IR<<1 mW probe). The laser is focused into multiple spots using a diffractive optic. The individual spots are sufficiently separated that confocality/ super-resolution is preserved. Light from the multiple spots is detected synchronously (with fiber bundle and photodiode array). This can be enabled by resonant signal processing. Multiplexing makes it possible for speeds up to $10^3$ faster. In the scenario shown in FIG. 4, the speed would be 29 times faster for the multiple probe configuration versus the single probe configuration.

Fast Data Acquisition and Tomography

A mature photothermal microscopy technique holds tremendous potential. Ultimately, one could envision three dimensional, chemical-specific video with resolutions around 100 nm. Such a technique would permit the direct observation of chemical processes in cells. The impact of such a technique on pharmaceutical development, medical research, and biotechnology cannot be understated. At present, tomography has been achieved by scanning the sample in all three dimensions (Zhang et al., "Depth-resolved mid-infrared photothermal imaging of living cells and organisms with submicrometer spatial resolution," Sci. Adv., 2, 1-8 (2016)). While this is a natural approach, the mechanical stage—which is necessary to acquire the full field of view— limits the rate of scanning to about 200 μs per pixel. The limitations of the scanned stage can be circumvented by scanning the focal spot, as opposed to the sample itself, by dithering a mirror in the optical path.

The most significant speed increase is granted by multiplexing. Multiple probe beams of slightly different angles are incident on the sample. Each individual beam is then detected coherently and demodulated. The effective time per pixel is thus reduced by N, where N is the number of channels. Ultimately, image acquisition rates less than 100 ns/pixel/spectral component are realizable currently. Further improvement will become practical as the demodulation/ data acquisition scheme matures.

Simultaneous Data Acquisition

There are multiple signals that are collected simultaneously with the OSIRIS signal. The DC intensity of the probe beam provides information about the sample topography and internal surfaces. Moreover, some of the probe photons are inelastically scattered, either due to fluorescence or Raman scattering. Depending on the sample and the preparation used, spectral character of this light can be combined with the OSIRIS spectra to great effect. For example:

For low-fluorescence samples, the Raman and infrared hyperspectral images together contain full label-free chemical information at the resolution of the probe beam.

Suppose a sample is prepared with a fluorescent marker (or markers) to highlight a particular chemical (or chemicals) of interest. The OSIRIS data serves to provide information about the chemical context while one of the many powerful fluorescence microscopy techniques can be performed simultaneously.

The result is an extremely rich dataset which includes OSIRIS, DC (scanning confocal), and inelastically scattered (Raman/fluorescence) signals as a function of time, spectral wavelength, and 3 dimensional position. Such a complete characterization is quite desirable in research applications.

Improvements

By recording higher harmonics of the photo-thermal signal (ac photodiode signal), signal noise can be reduced. This requires fast lock-ins that operate up to the frequency of the highest harmonic. One or more harmonics can be simultaneously collected and added together (simple or weighted sum) for increased SNR.

Dithering the sample along the optical axis of the objective (z axis), can make the microscope less sensitive to sample surface movement. In the photo-thermal modality, the IR laser heats the sample and this can raise the sample surface by some amount proportional to the absorption coefficient of the sample at that laser wavelength. This wavelength-selective surface movement can be used as signal feature and post-analyzed, but can also be removed by said dithering. An equivalent effect to sample dithering can be achieved by dithering the objective (or parts of it), or any suitable optic (lens, pinhole) along the collection path.

Excessive dwelling of the modulated IR laser at the same spot causes a continuous rise in average sample temperature at the focal spot (and also up to some distance away from it). This manifests itself as a change of confocal signal due to sample movements. If this is an issue, it can be remedied by using the galvo mirrors to quickly move away from the current measured spot to a spot that is far away from the last one so as not to cause excessive sample heating. Raster scanning still visits the neighboring spots so the heat load is higher in raster scanning. With galvos, the sample image can be built up by measuring pixels randomly (or some other non-sequential, non-rastering way). The added benefit of this is that scanning induced line artifacts will not be present in the image as any signal drift is distributed randomly across the image.

When doing signal alignment, the IR laser dwells at the same spot, and therefore causes it to heat. This is not the same regime as experienced during scanning (where less heating occurs) so the alignment between the IR and confocal signal may be compromised. To remedy this, alignment mode can be done by the galvo traversing a small area of the sample, similar to the technique above.

To increase the speed (bandwidth) of the galvo scanner mirror, the sample can be scanned using a Lissajous or other non-raster scanning pattern. In raster scanning the fast mirror goes back and forth in a sawtooth fashion while the other slowly scans in one direction. At the points of direction change, the acceleration of the fast mirror is very high and this limits the overall scanning frequency. Furthermore, having one mirror always scanning fast, while the other is slow, causes overheating and premature failure of one galvo. In Lissajous-type scanning, the two galvos share similar burden. The galvo positions are given by some functions $x(t)$ and $y(t)$ such that in a some time $T_{scan}$, they traverse the whole sample. By recording the position of galvos at any given time during the scan (along with the signals from the detectors), the image can easily be reconstructed. In each pixel of the image, those portions of the signal when the galvo placed the probe beam inside the said pixel are averaged. Functions $x(t)$ and $y(t)$ can found by optimizing for even image coverage in time 0 to $T_{scan}$. One possible functional choice would be $x(t)=\Sigma_{i=O}^{N}A_i \sin(v_i t+\theta_i)$ and $y(t)=\Sigma_{i=O}^{N}B_i \sin(w_i t+\theta\varphi_i)$. The task is then to pick N,M, A's, B's, w's and v's that most uniformly cover the image, while keeping max(v_i) and max(w_i) low enough. Think of this as some generalized Lissajous pattern. While useful, it is not important for the functions x and y to be periodic in $T_{scan}$. The conventional Lissajous pattern has N=M=1 and returns to initial position (i.e. is periodic). Another option for increasing the evenness of coverage is to utilize the stage movement during Lissajous type scans to effectively cover more area. By combining small stage movements with galvo scanning, the scan speed can be further reduced.

To minimize the reliance on slow stages, a hybrid stitching approach can be used in which the image is constructed by galvo scanning small patches with the stage stationary. After each patch is acquired, the scan moves to the next "tile". Tiles can also overlap which would increase coverage and evenness of coverage.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for spectroscopic imaging, comprising:
   a. directing a modulated infrared beam along an optical path to photo-thermally heat an area of a sample;
   b. directing more than one probe beams to the sample such that they are incident within the area heated by the modulated infrared beam, wherein each probe beam has a shorter wavelength than the infrared beam, wherein the probe beams are coherent, wherein each coherent probe beam has an aperture function comprising an amplitude and phase, and wherein the amplitude, the phase, or both of the aperture function of each coherent probe is altered to correct aberrations, achieve spatial resolution beyond the Abbe limit of the probe beam, or otherwise engineer a point spread function, wherein the amplitude and phase of the aperture function is altered either before or after the sample; and
   c. measuring light that is reflected, transmitted, re-emitted inelastically, or any combination thereof for each probe beam.

2. The method of claim 1, wherein the sample and probe beams are moved relative to each other and steps a-c are repeated multiple times to create a 2D or 3D chemical image of the sample.

3. The method of claim 1, wherein the sample and probe beams are moved relative to each other and steps a-c are repeated multiple times to create a 2D or 3D chemical image of the sample.

4. A method for spectroscopic imaging of a transparent or partially transparent sample, comprising:
   a. directing a modulated infrared beam along an optical path to photo-thermally heat an area of a sample;
   b. directing a probe beam multiple times through a location on the sample to enhance the spatial resolution due to interference between the probe beam, to enhance the photo-thermally induced modulation of the probe beam such that they are incident within the area heated by the modulated infrared beam, or both, wherein the probe beam has a shorter wavelength than the infrared beam; and
   c. measuring light that is reflected, transmitted, re-emitted inelastically, or any combination thereof for each probe beam.

5. The method of claim 4, wherein the sample and probe beam are moved relative to each other and steps a-c are repeated multiple times to create a 2D or 3D chemical image of the sample.

6. The method of claim 4, wherein the probe beam is coherent, wherein the coherent probe beam has an aperture function comprising an amplitude and phase, and wherein the amplitude, the phase, or both of the aperture function of the coherent probe beam is altered to correct aberrations, achieve spatial resolution beyond the Abbe limit of each probe beam, or otherwise engineer a point spread function.

7. The method of claim 6, wherein the sample and probe beam are moved relative to each other and steps a-c are repeated multiple times to create a 2D or 3D chemical image of the sample.

8. A method for spectroscopic imaging of a transparent or partially transparent sample, comprising:
   a. directing a modulated infrared beam along an optical path to photo-thermally heat an area of a sample;
   b. directing more than one probe beam one or multiple times through a location on the sample to enhance the spatial resolution due to interference between the probe beam, to enhance the photo-thermally induced modulation of the probe beam such that they are incident within the area heated by the modulated infrared beam, or both, wherein each probe beam has a shorter wavelength than the infrared beam, wherein each probe beam is directed to a different location on the sample; and
   c. measuring light that is reflected, transmitted, re-emitted inelastically, or any combination thereof for each probe beam.

9. The method of claim 8, wherein the sample and probe beams are moved relative to each other and steps a-c are repeated multiple times to create a 2D or 3D chemical image of the sample.

10. The method of claim 8, wherein the probe beams are coherent, wherein each coherent probe beam has an aperture function comprising an amplitude and phase, and wherein the amplitude, the phase, or both of the aperture function of the coherent probe beam is altered to correct aberrations, achieve spatial resolution beyond the Abbe limit of each probe beam, or otherwise engineer a point spread function.

11. The method of claim 10, wherein the sample and probe beam are moved relative to each other and steps a-c are repeated multiple times to create a 2D or 3D chemical image of the sample.

12. A method for photo-thermal spectroscopic imaging, comprising:
   a. directing a modulated infrared beam along an optical path to photo-thermally heat an area of a sample;
   b. directing one or more than one coherent probe beams to the sample such that they are incident within the area heated by the modulated infrared beam, wherein each probe beam has a shorter wavelength than the infrared beam, wherein each coherent probe beam has an aperture function comprising an amplitude and phase; and
   c. measuring light that is reflected, transmitted, re-emitted inelastically, or any combination thereof for each probe beam;
   wherein the amplitude and phase of the aperture function of each coherent probe beam is altered to correct aberrations, achieve spatial resolution beyond the Abbe limit of the probe beam, or otherwise engineer a point spread function, wherein the amplitude and phase of the aperture function are altered either before or after the sample.

13. The method of claim 12, wherein the sample and probe beams are moved relative to each other and steps a-c are repeated multiple times to create a 2D or 3D chemical image of the sample.

14. A system comprising:
   a. a modulated infrared light source;
   b. an optical system for generating one or more coherent probe beams, wherein each coherent probe beam has an aperture function comprising an amplitude and phase;
   c. means for directing the infrared and probe beams to a sample;
   d. a device for moving the probe beam and the sample relative to each other;
   e. light detectors and filtering optics for each probe beam;
   f. demodulation and digitization electronics for each probe beam; and
   g. means for altering the amplitude and phase of the aperture function of each coherent probe beam to correct aberrations, achieve spatial resolution beyond the Abbe limit of the probe beam, or otherwise engineer a point spread function.

15. The method of claim 14, wherein the means of directing the infrared and probe beams comprises mirrors, lenses, or both.

16. The method of claim 14, wherein the means of altering the amplitude and phase of the aperture function comprises passive optics comprising transparent or partially transparent masks (apodizers), holographic optics, lenses, mirrors, or any combination thereof.

17. The method of claim 14, wherein the means of altering the amplitude and phase of the aperture function comprises active optics comprising deformable mirrors, spatial light modulators, a micromirror array, or any combination thereof.

18. The system of claim 14, wherein the optical system generates more than one probe beam.

19. The system of claim 14, wherein the means for directing the infrared and probe beams to the sample comprises a means for directing each probe beam one or multiple times through a location on the sample, to enhance the spatial resolution due to interference between the probe beam, to enhance the photo-thermally induced modulation of the probe beam, or both.

* * * * *